April 28, 1925.  1,535,948
E. A. RICH, JR
SAND CUTTER OR MIXER
Filed Dec. 29, 1923

Witness:

Inventor
Elmer A. Rich Jr.

Patented Apr. 28, 1925.

1,535,948

UNITED STATES PATENT OFFICE.

ELMER A. RICH, JR., OF CHICAGO, ILLINOIS, ASSIGNOR TO THE AMERICAN FOUNDRY EQUIPMENT COMPANY, OF NEW YORK, N. Y., A CORPORATION OF OHIO.

SAND CUTTER OR MIXER.

Application filed December 29, 1923. Serial No. 683,492.

*To all whom it may concern:*

Be it known that I, ELMER A. RICH, Jr., a citizen of the United States, residing at Chicago, in the county of Cook and State of Illinois, have invented a certain new and useful Improvement in Sand Cutters or Mixers, of which the following is a full, clear, concise, and exact description, reference being had to the accompanying drawings, forming a part of this specification.

My invention relates to sand cutters or mixers, such as are used in foundries, and particularly to the cutting device thereof.

One of the objects of the invention is to provide a simple, practical and advantageous construction of sand cutting or mixing machine.

Another object of the invention is to protect the cutting device of the machine from becoming injured by striking hard and foreign objects or articles in the sand which the machine is working.

In carrying out my invention in the manner herein disclosed I provide protecting members which are preferably embodied in the cutting device and made a part of the same, and are adapted to strike the foreign objects or articles and prevent the blades or other cutting elements of the cutting device from striking said objects or articles, thereby protecting the cutting device and saving it from damage or injury.

Figure 1:
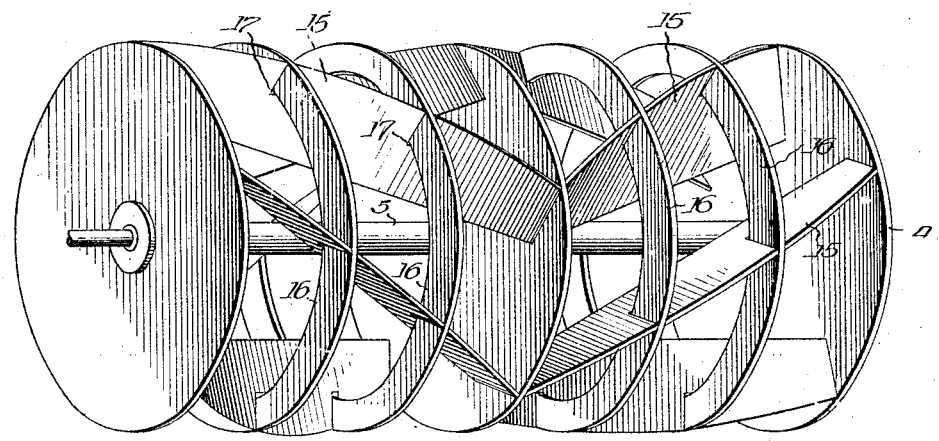

In the accompanying drawings Fig. 1 is a perspective view of a cutting member or device for sand cutting or mixing machines embodying my present invention.

Figure 2:
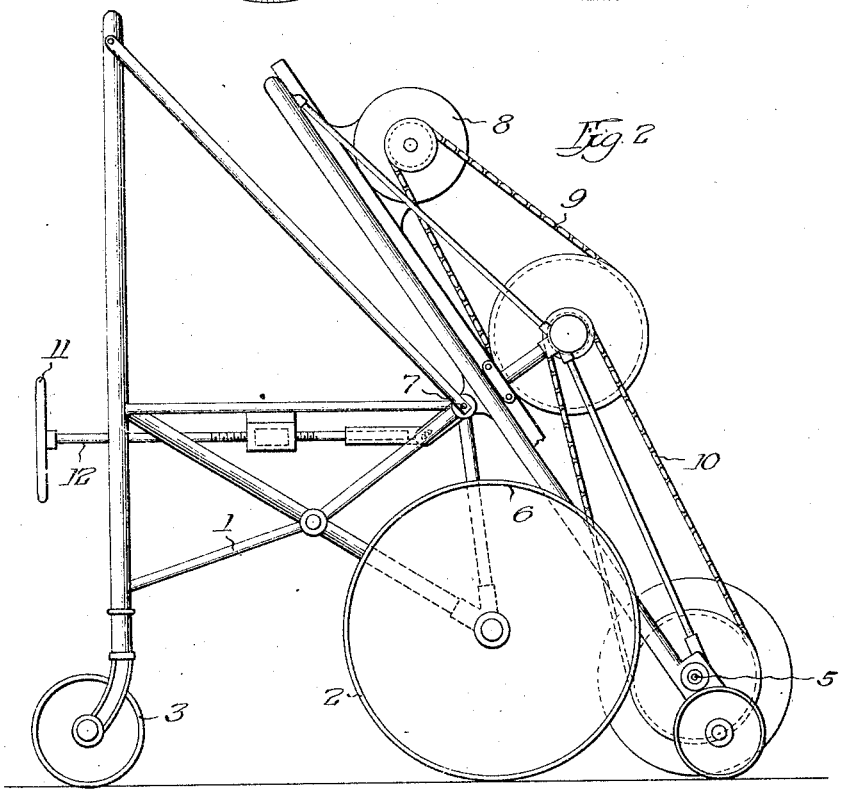

Fig. 2 is a side elevation of a sand cutting machine or mixer embodying this cutting device or member.

Referring to the drawings, I show a simple type of cutting machine embodying a body frame 1, front wheels 2, and rear wheels 3. This machine is shown for the purpose of illustrating my invention, although it will be understood the latter is applicable to various forms and types of sand cutting machines.

A rotary cylindric cutting device 4 is shown mounted on the machine frame 1, in such manner that it may be adjusted vertically, to apply it to its work and for other purposes.

In the arrangement shown, the cutting device 4 has its axle 5 mounted at one end of a swinging frame 6 which is pivoted on the machine frame at 7. On the other end of the frame 6 there is preferably mounted a driving mechanism such as an electric motor 8 and this is connected by belts or chains 9 and 10 cutting cylinder 5 so that the cutting cylinder will be driven by the motor 8. The pivoted arrangement of the frame 6 permits the cutting cylinder to be raised and lowered as desired for the work and for other purposes. A rotary handle 11 on a shaft 12 controls the tilting adjustment of frame 6. As this is no part of my present invention, it will not be further described.

The cutting device shown comprises cutting blades 15—15 adapted to cut, toss and mix the sand and these blades are conveniently mounted in any suitable or preferred manner on the rotary axle 5 so that when the cutting device is driven the blades will rotate at high speed as desired.

In accordance with my invention I provde protective devices for protecting the cutting blades 15, the form of protective devices shown preferably comprising a ring 16 and there being a plurality or set of these rings 16—16 arranged on the cutting cylinder or device 4. The rings 16 are preferably of the same diameter as the cutting blades 15 and are so arranged as to cut or intersect the cutting blades 15 at 17, as shown in Fig. 1. Thus the rings provide a series of protecting members or devices arranged at intervals along the cutting member 4, each member or device affording an element extending between successive blades so that these rings or equivalent members 16 will themselves strike the foreign articles or obstructions as the cutting cylinder 4 rotates, and will consequently take up the blow and shield or protect the cutting blades from injury or damage. The rings 16 may cause the cutting cylinder to rise when they strike the foreign articles or obstructions, thus lifting the cutting blades and so saving them from injury; or the rings may knock the articles or obstructions to one side or prevent their entering the path of travel of the cutting blades and so save the latter from injury. Repair and replacement of cutting blades thus becomes practically unnecessary.

It will be understood also that the protective devices may take other specific forms and that various other changes and modifications may be made without departing from the spirit of the invention.

What I claim is:

1. A sand cutting machine having a sand cutting device provided with means for protecting the cutting elements from injury by foreign articles or obstructions.

2. A sand cutting machine having a sand cutting device provided with means for striking foreign articles or obstructions in the sand and so saving the cutting elements of said cutting device from damage or injury.

3. A sand cutting machine having a sand cutting device provided with means associated with the cutting elements and adapted to strike foreign articles or obstructions and save the cutting elements from damage or injury.

4. A sand cutting machine having a sand cutting device provided with means associated with the cutting elements and adapted to strike foreign articles or obstructions and save the cutting elements from damage or injury, said means comprising devices extending at intervals between the cutting elements.

5. A sand cutting machine having a sand cutting device provided with means associated with the cutting elements and adapted to strike foreign articles or obstructions and save the cutting elements from damage or injury, said means comprising rings on the cutting device between the blades thereof.

6. A cutting device for sand cutting machines comprising a rotary cylinder having rotary cutting blades and rings encircling the cylinder and crossing the blades.

In witness whereof, I hereunto subscribe my name this 21st day of November, A. D., 1923.

ELMER A. RICH, Jr.